United States Patent
Liebler-Ranzus

(10) Patent No.: US 7,555,093 B1
(45) Date of Patent: Jun. 30, 2009

(54) SPACER FOR A FUEL ASSEMBLY OF A BOILING WATER REACTOR

(75) Inventor: Michael Liebler-Ranzus, Heilsbronn (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 10/692,637

(22) Filed: Oct. 24, 2003

Related U.S. Application Data

(63) Continuation of application No. PCT/EP03/00081, filed on Jan. 8, 2003.

(30) Foreign Application Priority Data

Feb. 27, 2002 (DE) .............................. 102 08 502

(51) Int. Cl.
G21C 3/32 (2006.01)
(52) U.S. Cl. .................... 376/439; 376/441; 376/443
(58) Field of Classification Search ................ 367/434, 367/442, 371, 443, 439, 453, 272; 376/376, 376/439, 441, 443
See application file for complete search history.

(56) References Cited

U.S. PATENT DOCUMENTS

| | | | | |
|---|---|---|---|---|
| 4,692,302 A | * | 9/1987 | DeMario et al. | ............. 376/439 |
| 4,728,490 A | * | 3/1988 | Taleyarkhan | ................. 376/439 |
| 4,999,153 A | * | 3/1991 | Johansson et al. | ........... 376/443 |
| 5,080,858 A | * | 1/1992 | Nylund | ....................... 376/443 |
| 5,307,392 A | | 4/1994 | Bryan | |
| 5,311,564 A | | 5/1994 | Steinke | |
| 5,331,679 A | * | 7/1994 | Hirukawa | .................... 376/439 |
| 5,404,383 A | * | 4/1995 | Nylund | ........................ 376/438 |
| 5,530,729 A | * | 6/1996 | Gustafsson | .................. 376/439 |
| 6,744,843 B2 | * | 6/2004 | Kang et al. | .................. 376/439 |

FOREIGN PATENT DOCUMENTS

| | | |
|---|---|---|
| EP | 0 557 085 A1 | 8/1993 |
| GB | 1116811 | 6/1968 |
| JP | 60-66188 | 4/1985 |
| JP | 02002980 | 1/1990 |
| JP | 02093398 | 4/1990 |
| JP | 02147889 | 6/1990 |
| JP | 03181887 | 8/1991 |
| JP | 05323073 A | 12/1993 |
| JP | 7-43486 | 2/1995 |

(Continued)

OTHER PUBLICATIONS

U.S. Patent No. 4,999,153 (Johansson et al.), dated Mar. 12, 1991.

(Continued)

*Primary Examiner*—Rick Palabrica
(74) *Attorney, Agent, or Firm*—Laurence A. Greenberg; Werner H. Stemer; Ralph E. Locher

(57) ABSTRACT

A spacer for a fuel assembly of a boiling water reactor has a frame formed of outer webs and inner webs disposed crosswise relative each other. Gills are disposed on the exterior of the outer webs. The exterior of the outer webs of the spacer is provided with a plurality of projections in the form of bulges in the wall. The bulges project outwardly by a greater distance than the gills.

6 Claims, 3 Drawing Sheets

FOREIGN PATENT DOCUMENTS

| | | |
|---|---|---|
| JP | 08297183 | 11/1996 |
| JP | 08304574 | 11/1996 |
| JP | 2001194479 | 7/2001 |

OTHER PUBLICATIONS

U.S. Patent No. 5,307,392 (Bryan), dated Apr. 26, 1994.
U.S. Patent No. 5,311,564 (Steinke), dated May 10, 1994.
U.K. Patent Application GB 1,116,811 (Seddon et al.), dated Jun. 12, 1968.
European Patent Application EP 0 557 085 A1 (Matzner et al.), dated Aug. 25, 1993.
Patent Abstracts of Japan 03181887 (Yuji), dated Aug. 7, 1991.
Patent Abstracts of Japan 08304574 (Yuji), dated Nov. 22, 1996.
Patent Abstracts of Japan 02002980 (Akihiro), dated Jan. 8, 1990.
Patent Abstracts of Japan 2001194479 (Masahiko), dated Jul. 19, 2001.
Patent Abstracts of Japan 02093398 (Shinichi), dated Apr. 4, 1990.
Patent Abstracts of Japan 02147889 (Kiyoshi), dated Jun. 6, 1990.
Patent Abstracts of Japan 08297183 (Terufumi), dated Nov. 12, 1996.
Patent Abstracts of Japan 05323073 A (Shigeru), dated Dec. 7, 1993.
International Search Report, dated Sep. 3, 2003.
German Search Report, dated Sep. 27, 2002.

* cited by examiner

SPACER FOR A FUEL ASSEMBLY OF A BOILING WATER REACTOR

CROSS-REFERENCE TO RELATED APPLICATION

This application is a continuation of copending International Application No. PCT/EP03/00081, filed Jan. 8, 2003, which designated the United States and which was not published in English.

BACKGROUND OF THE INVENTION

Field of the Invention

The invention lies in the boiling water reactor technology field. More specifically, the invention relates to a spacer for a fuel assembly of a boiling water reactor.

A spacer of the generic type, as it is known, for example, from U.S. Pat. No. 4,999,153, is generally composed of inner webs that are fitted crossways into one another and a frame which surrounds the inner web and is formed from outer webs. In the outer webs, there are openings which are used to detach a film, or sheet, of coolant flowing along the inner wall of the fuel assembly channel and to divert the film of coolant inward, so that the coolant comes into contact with the fuel rods. The upper edge of the opening and the adjoining wall region of the outer webs is pre-curved outward. This configuration is generally referred to as a gill.

To repair a fuel assembly, for example to exchange a fuel rod, it is necessary for the fuel assembly to be removed from the flow-guiding channel and subsequently reintroduced. Although the extent to which the gills project is such that a gap is present between the gills and the fuel assembly channel in the installed state, for example in order to allow radiation-induced growth in the width direction in the case of spacers made from Zircaloy, this gap does not prevent the gills from coming into contact with the inner wall of the fuel assembly channel. In this event, there is a risk of the projecting gills scraping along the inner side of the fuel assembly channel and in the process shaving off fine chips of metal or of being damaged themselves.

SUMMARY OF THE INVENTION

It is accordingly an object of the invention to provide a spacer for a fuel assembly of a boiling water reactor which overcomes the above-mentioned disadvantages of the heretofore-known devices and methods of this general type and which provides an elegant solution and a remedy to the above problem.

With the foregoing and other objects in view there is provided, in accordance with the invention, a spacer for a fuel assembly of a boiling water reactor, comprising:

a frame formed with outer webs and inner webs oriented crossways with respect to one another;

gills formed on an outer side of the outer webs and projecting to a given extent from the outer side; and a plurality of projections or bosses each formed by a bulge in a wall of the outer webs and projecting outwardly to a greater extent than the given extent of the gills.

In accordance with an added feature of the invention, the projections are formed geodetically below the gills.

In other words, the objects of the invention are achieved by virtue of the fact that a plurality of projections, which are formed by a bulge in the wall and project outwardly to a greater extent than the gills, are present on the outer side of the outer webs. This effectively prevents gills from being damaged or metal particles from being shaved off a flow-guiding channel when a fuel assembly is being introduced into the flow-guiding channel. It is preferable for the projections to be arranged below the gills. This prevents them from colliding with the upper edge of the flow-guiding channel when the fuel assembly is being introduced into the flow-guiding channel, an operation which for radiation protection reasons has to take place at a level of several meters below the water level.

A similar purpose is served, in accordance with an additional preferred configuration, by the measure of providing the projections, at their lower edge, with a deflector lug which is angled off toward the center of the spacer. If the fuel assembly becomes twisted as it is being introduced into the flow-guiding channel, it is the deflector lugs which first come into contact with the top edge of the flow-guiding channel, thereby centering the fuel assembly and ensuring that the latter is introduced without friction. The projections then fulfill a dual role, since they simultaneously serve as an aid to threading in the fuel assembly. It is preferable for these projections to be arranged in the region of an inner web, so that the forces acting on them are transmitted into the inner web. Moreover, the inner web can be used both to support the projection and to support the deflector lug which is formed integrally thereon. For this purpose, the inner web has a first and a second supporting section, with the first supporting section extending into the projection, where it interacts with the inner wall of the latter, while the second section has an inclined edge against which the deflector lug bears.

In accordance with a preferred configuration, an inner web is fixed in the region of a projection by virtue of the fact that a slot which extends axially or in the longitudinal direction of the fuel assembly and is at least partially penetrated by the first supporting section is present in the wall of the projection. The slot is arranged in an outer-side recess of the projection. This has the advantage that a weld seam for joining the inner web to the outer web can be formed there without this seam projecting above the outer surface of the projection.

Other features which are considered as characteristic for the invention are set forth in the appended claims.

Although the invention is illustrated and described herein as embodied in a spacer for a fuel assembly of a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
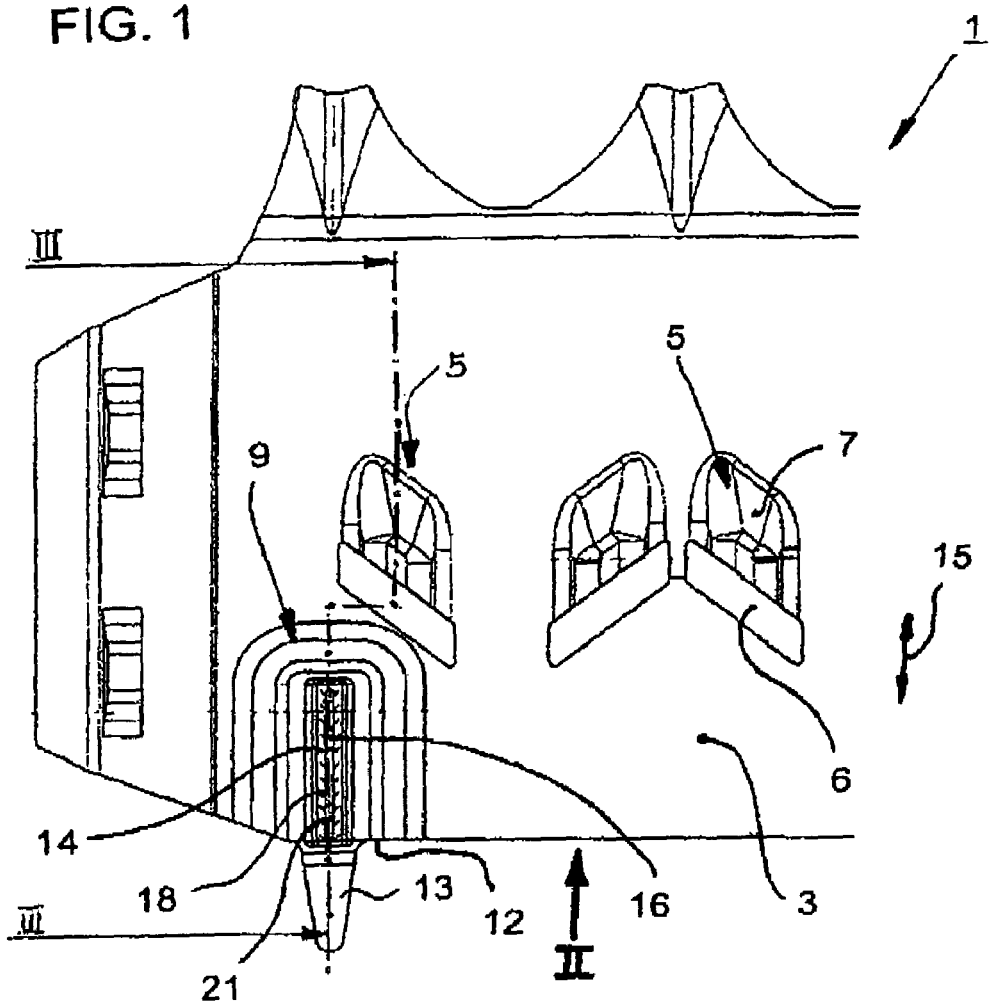
FIG. 1 is a side view of portion of a spacer according to the invention.
Figure 2:
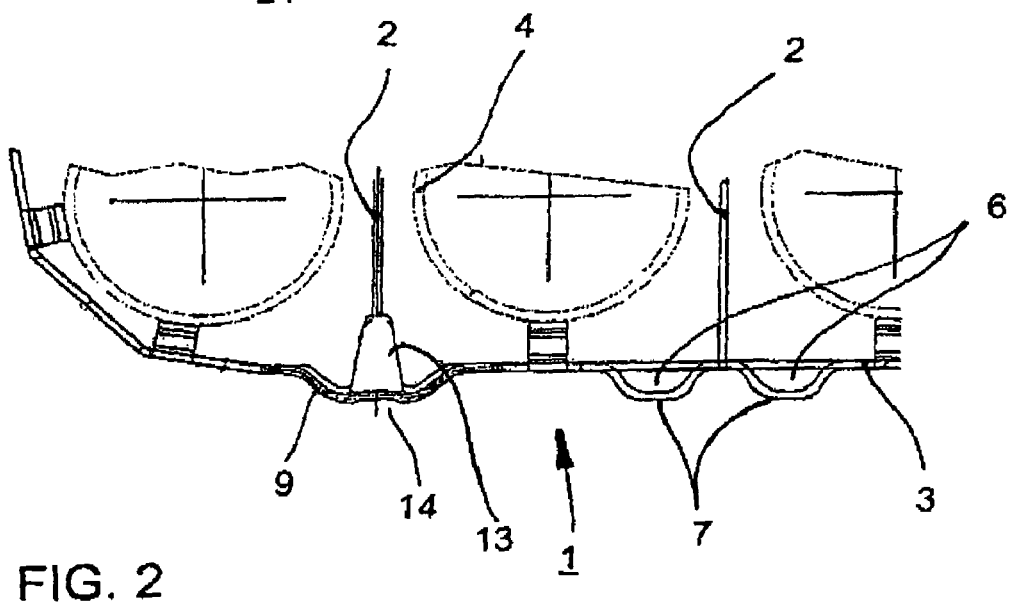
FIG. 2 is a plan view oriented into the direction of the arrow II shown in FIG. 1.

Referring now to the figures of the drawing in detail and first, particularly, to FIG. 1 thereof, a spacer 1 for the fuel assembly of a boiling water reactor is composed of inner webs 2 which are fitted into one another crossways and a frame of outer webs 3 surrounding the inner web. The inner webs 2 form cells, through which, in the assembled state, fuel rods 4 are fitted. A plurality of gills 5 are formed on the outer side of the outer webs 3. These gills 5 comprise an opening 6, of which the upper edge and the adjoining wall section 7 are pre-curved outward. To prevent the gills 5 and/or the wall section 7 from coming into contact with the inner wall of the fuel assembly channel when a fuel assembly is being introduced into a fuel assembly channel 8, projections 9, which are formed by bulges in the wall, project from the outer side of the outer web 3. The extent to which the projections 9 project is greater than the extent to which the gills 5 project, so that, in the assembled state or during the introduction of a fuel assembly into a fuel assembly channel 8, the distance 10 between the gills 5 and the inner side of the fuel assembly channel 8 is greater than the distance 11 between the projection 9 and the fuel assembly channel 8.

Figure 3:
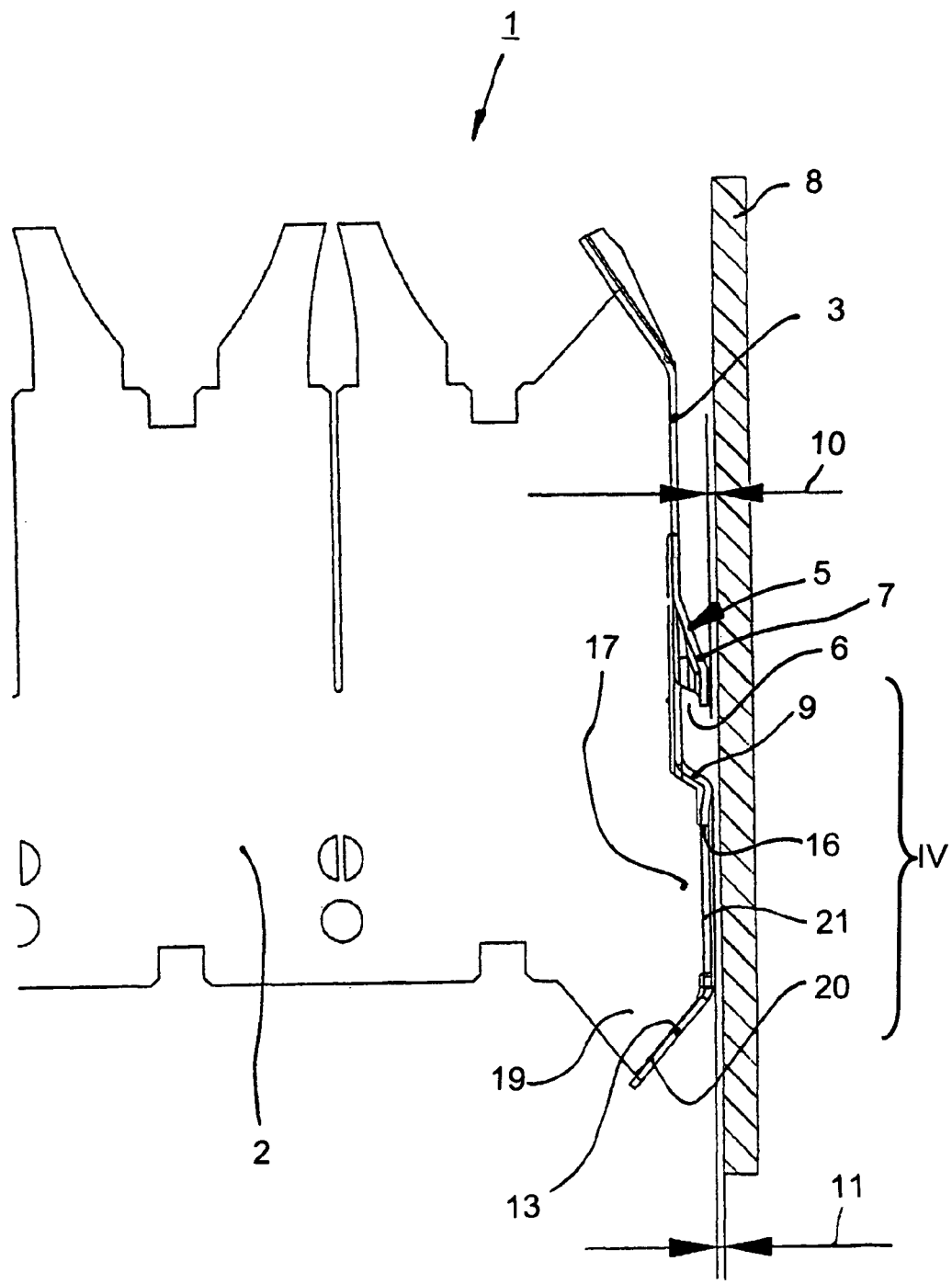
FIG. 3 is a partially sectional view of portion of a spacer arranged close to a flow-guiding channel.
Figure 4:
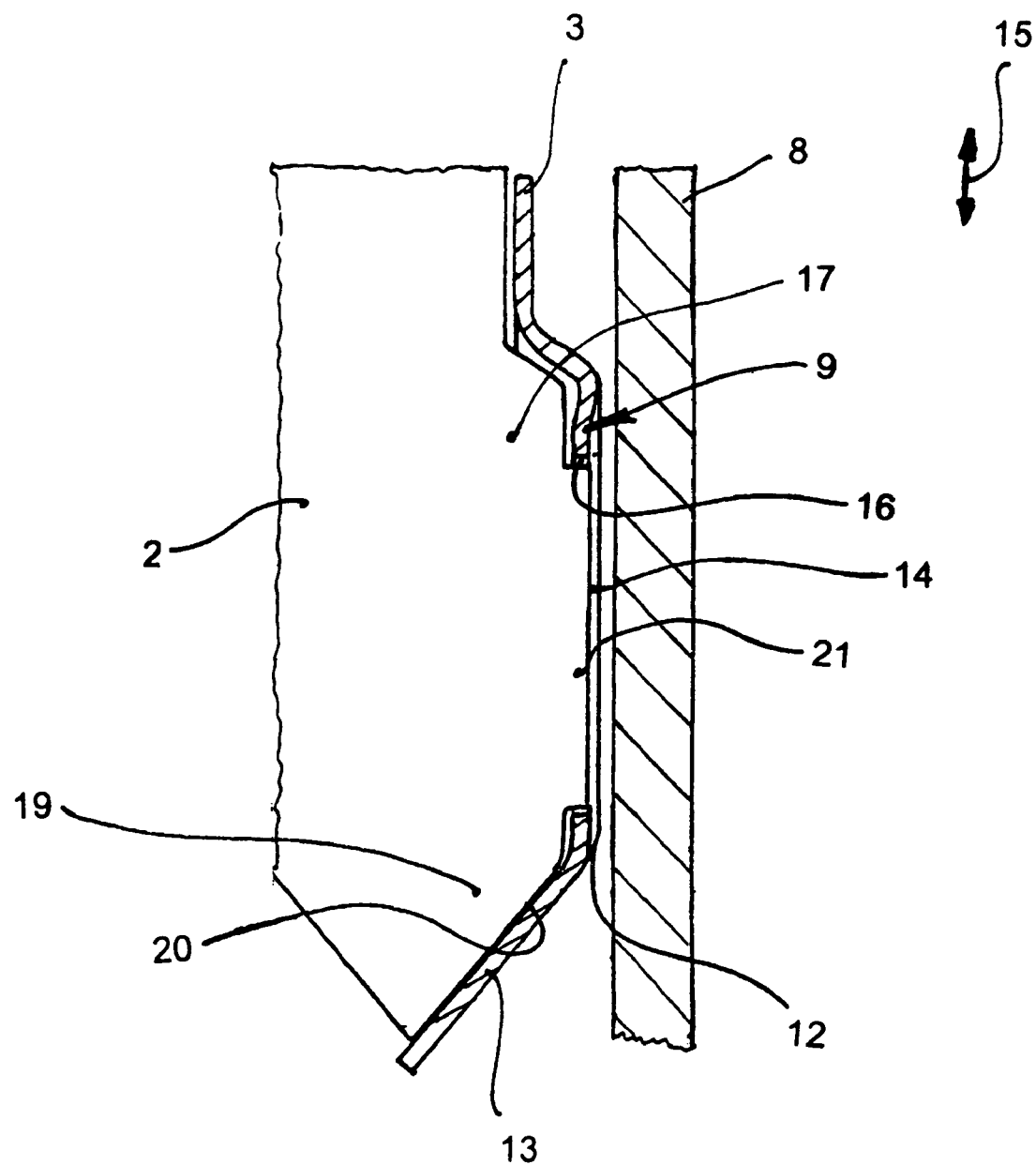
FIG. 4 is a detail IV from FIG. 3 on an enlarged scale.

A deflector lug 13 which is approximately the in shape of a spatula and is bent inward is formed integrally on the lower edge 12 of the projection 9. In the outer side of the projection 9 there is a recess 14, wherein a slot 16 extending in the axial direction 15 is arranged. As can be seen clearly in particular from FIGS. 3 and 4, a first supporting section 17, which projects beyond the side edge of the inner web 2 and extends into the projection 9, is formed integrally on the inner web 2 assigned to projection 9, the supporting section 17 having a basic shape which corresponds to the inner contour of the projection 9. A connecting lug 21, which projects through the slot 16, is formed integrally on the first supporting section 17. The connecting lug 21 is fixed to the outer web 3 from the outer side of the projection 9 by a weld seam 18. A second supporting section 19, which has an inclined edge 20 with an orientation which is complementary to the inclination of the deflector lug 13, is formed integrally on the lower edge of the inner web 2. The deflector lug 13 is supported on this inclined edge 20.

I claim:

1. A spacer for a fuel assembly of a boiling water reactor having a fuel assembly channel with an inner side, the spacer comprising:

a frame formed with outer webs and inner webs oriented crossways with respect to one another, said outer webs having an outer side facing towards the inner side of the fuel assembly channel in an assembled state;

gills formed on said outer side of said outer webs and projecting outward to a given extent from said outer side, said gills each including an opening in said outer web defining an upper edge of said opening and an adjoining wall region of said outer webs both being pre-curved outward;

a plurality of projections each formed by an outward bulge in a wall of said outer webs, said projections each having a lower edge extending to and being identical with a lower edge of a respective one of said outer webs and projecting outwardly to a greater extent than said given extent of said gills, said projections each being disposed in a region of a respective one of said inner webs; and a deflector lug formed integrally on a lower edge of said projections.

2. The spacer according to claim 1, wherein said projections are formed below said gills.

3. The spacer according to claim 1, wherein said inner web has a lateral edge and a first supporting section integrally formed on and laterally projecting beyond said lateral edge, wherein said first supporting section extends into and is connected to said projection.

4. The spacer according to claim 3, wherein said inner web has a lower edge and a second supporting section integrally formed on said lower edge, said second supporting section having an inclined edge and a deflector lug supported against said inclined edge.

5. The spacer according to claim 3, wherein said projection has an outer side formed with a recess, said recess extends in an axial direction and having formed therein a slot with said first supporting section at least partially penetrating through said slot.

6. The spacer according to claim 1, wherein said projections project outwardly to a greater extent than said given extent of said gills to prevent said gills from coming into contact with a channel of the fuel assembly.

* * * * *